Oct. 29, 1957
W. BORNEMANN
2,811,352
APPARATUS FOR INSERTING AND WITHDRAWING
DISCRETE ELEMENTS INTO AND FROM
AN OPEN END RECEPTACLE
Filed Oct. 14, 1955
3 Sheets-Sheet 1
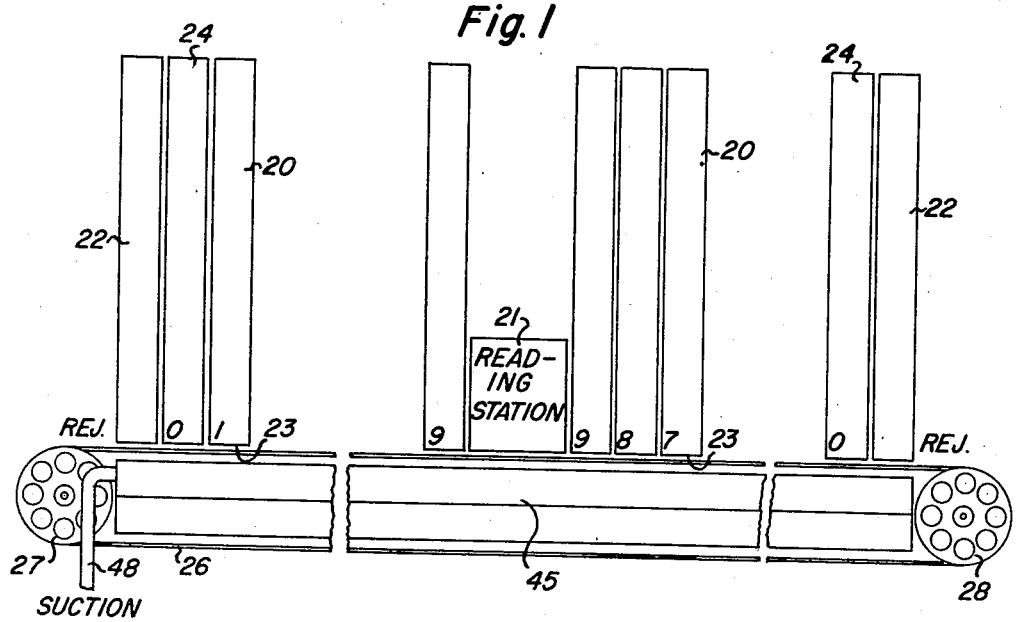
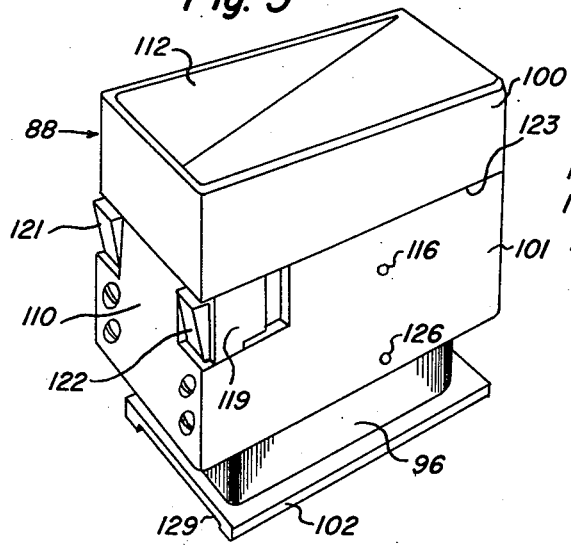
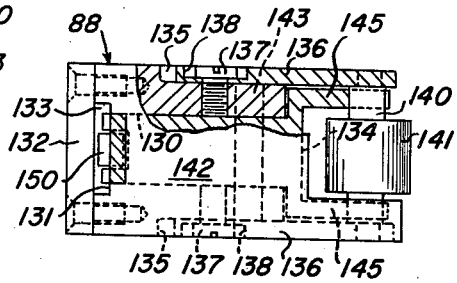
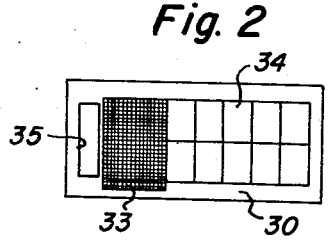
WILLIAM BORNEMANN
INVENTOR.
BY
ATTORNEY & AGENT

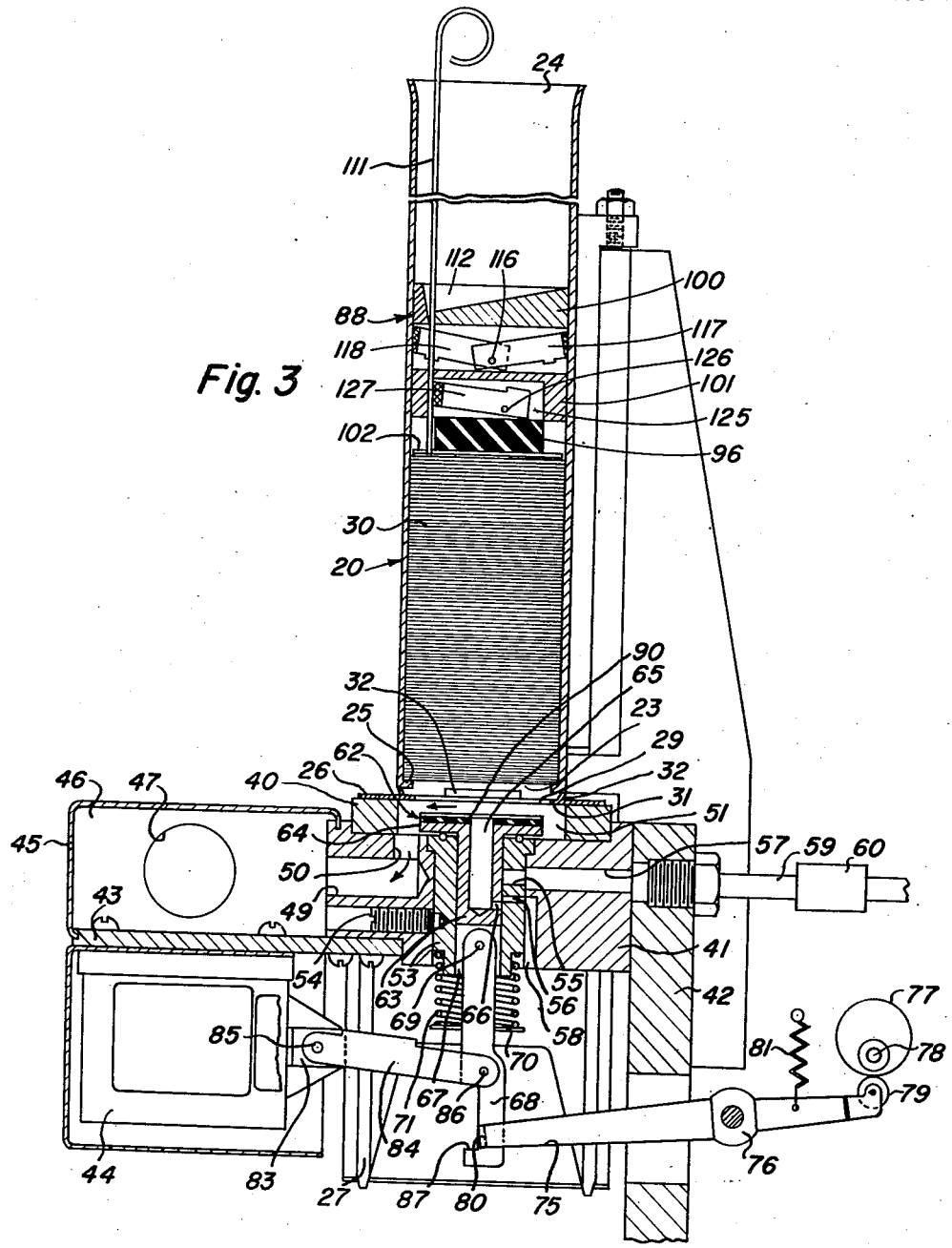

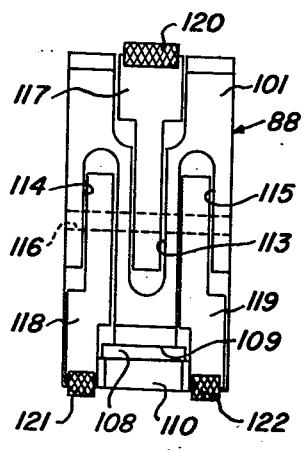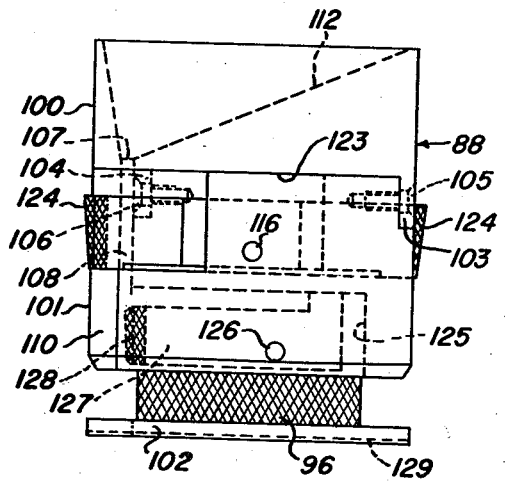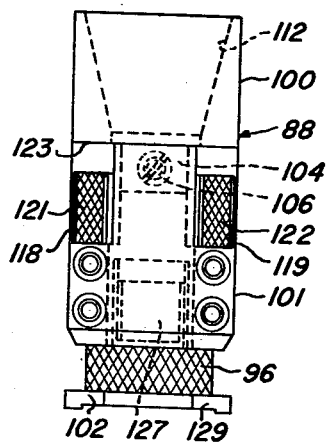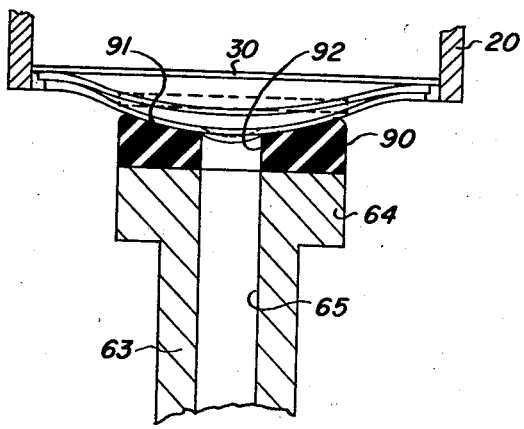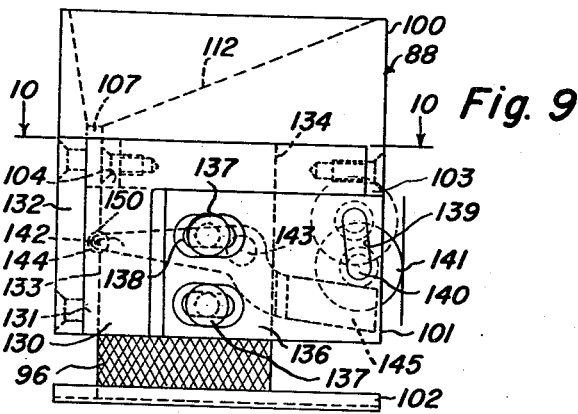

United States Patent Office 2,811,352
Patented Oct. 29, 1957

2,811,352

APPARATUS FOR INSERTING AND WITHDRAWING DISCRETE ELEMENTS INTO AND FROM AN OPEN END RECEPTACLE

William Bornemann, Rochester, N. Y., assignor to Eastman Kodak Company, Rochester, N. Y., a corporation of New Jersey Application October 14, 1955, Serial No. 540,471

24 Claims. (Cl. 271—5)

The invention relates to apparatus in which a stack of discrete elements are retained in an open end receptacle and are subjected to a repetitive force delivered thereto as the elements are successively withdrawn from or inserted into the receptacle and to means for inserting and withdrawing such discrete elements into and from the receptacle and to means for stabilizing the plurality of elements retained in the receptacle.

In apparatus for sorting and/or delivering discrete elements which are relatively thin, the elements are usually stacked in a receptacle and removed from or inserted therein by a member which is moved into contact with the stack. As a result, the member delivers a blow or a force to the stack which causes the elements at the top of the stack to flutter and possibly jam the receptacle. Also, in order to obtain the most effective withdrawal of the lowermost element in the stack, it is essential that the elements be maintained in flat and contiguous relation, particularly if the elements are of a thickness and weight which permit them to be readily deformed or possess any inherent qualities, such as curl. Such conditions may exist in apparatus utilized for the handling, sorting or transporting of elements made from paper, film and even very thin metal blanks.

The invention is disclosed and described in conjunction with apparatus for sorting pieces of film which contain both photographic images of documents and code related to the document images. As is well-known in the photographic art, abrasion of the surfaces of a film is to be avoided in order that the reproduction qualities thereof are not impaired. For this reason, it is necessary to take every precaution to insure that abrasion does not take place. In the disclosed apparatus a stabilizing member is utilized in the receptacle in which the elements are stacked to weight the stack in order to maintain the elements flat and in contiguous relation, to absorb or damp any force applied to the elements or the receptacle which tends to move the stack away from the supporting lips, and to retain the elements in the receptacle under any conditions. In known types of sorters, the elements are arranged in a stack within a receptacle and the mechanism is operable to either insert or move the element into the receptacle or to withdraw it from the receptacle. The present invention differs from the prior art in that the receptacle is capable of both receiving the discrete elements as well as having the elements withdrawn therefrom, the mechanism associated with the receptacle being capable of selectively performing this dual function.

The primary object of the invention is, therefore, to provide a device for inserting and withdrawing elements into and from a receptacle by means which prevent abrasion of the elements and which eliminate jamming of the elements in the receptacle.

A further object of the invention is to provide a receptacle capable of receiving discrete elements as well as having discrete elements withdrawn therefrom and means cooperating with said receptacle for inserting and withdrawing the discrete elements.

A still further object of the invention is to provide a receptacle capable of receiving discrete elements as well as having discrete elements removed therefrom and means which cooperate with lips on the receptacle for inserting and removing said elements to distort the plane of the element being withdrawn with respect to the next and adjacent element as the element is moved past the lips during withdrawal.

Another object of the invention is to provide a stabilizing means for a stack of elements retained in a receptacle into and from which the elements can be inserted and withdrawn and which serves as weight, retainer and shock absorber of any force applied to the receptacle or elements tending to move the elements away from the supporting means therefor.

Yet another object of the invention is to provide a stabilizing means for a stack of elements retained in a receptacle into and from which the elements can be inserted and withdrawn and which comprises a plurality of braking members which are moved into engagement with opposed sides of the receptacle by any force applied to the receptacle or elements to limit movement of the stabilizing means and the elements.

Still another object of the invention is to provide a stabilizing means for a stack of elements retained in a receptacle into and from which the elements can be inserted and removed and which comprises a weight portion and a resilient pad fixed thereto for damping any force applied to the stack of elements as an element is being inserted or withdrawn from the receptacle.

And another object of the invention is to provide means for withdrawing the lowermost element from the stack and which insures that no double feed will result.

The invention is described in conjunction with a device for sorting rectangular-shaped pieces of film having a code area and a document image area and provided with an elongated transverse aperture adjacent one edge thereof. The pieces of film are relatively small in size and are of the order of five-eighths of an inch in width by one and a quarter inches in length. Since the size and nature of the film is such that individual handling is prohibitive, the elements are handled for inserting into and withdrawal from the apparatus by a device such as is disclosed in the copending patent application Serial No. 517,611, filed June 23, 1955, in the name of William Bornemann and Carter J. Hughey. By this device the elements are inserted into or withdrawn from an open-end receptacle having lips adjacent one open end thereof for supporting the elements in a stacked and aligned relation superposed one upon the other. The elements are withdrawn successively from the bottom of the feed receptacle and deposited on a conveying means. Each element is then moved past a reading station in which one of the lines of code is scanned to determine into which receptacle the element is to be inserted. After reading of the code, the conveyor carries the element past a group of receptacles and when the element is aligned with the proper receptacle in accordance with the code, the element is then inserted into the receptacle. Insertion of the element into a receptacle, or withdrawal thereof, is accomplished by a reciprocating feed member and withdrawal is accomplished by the same member in conjunction with a vacuum applied thereto only during the interval of withdrawal. Since the receptacles can be utilized as either feeding or receiving stations, the feed member associated with each receptacle serves to both insert or withdraw elements depending on the sorting procedure set up. The feeding member is moved beyond the plane of the lowermost element in its extreme position in order to guarantee actual contact with the lowermost element for withdrawal and to bow the element past the stack supporting lips when the element is being inserted in the receptacle. Since no restraining means is utilized in connection with the feed member, the stack of elements receives an impact blow with each engagement by the feed member. This force applied to the stack is transmitted through the stack and causes the elements at the top of the stack to flutter and to become disarranged with the possibility of also jamming the magazines. By this action, the problem of abrasion is also introduced.

In order to overcome these difficulties, a stabilizing member having at least one pivoted brake pawl with a non-metallic face and a rubber cushion is inserted in the receptacle with the rubber cushion in engagement with the uppermost element in the stack. The stabilizing member together with the brake pawl and rubber cushion is sufficiently heavy to serve as a weight to maintain the elements flat and in contiguous relation. The action of the brake member is one of reaction to the force applied to the stack by the feeding member whereby the brake member expands against opposed sides of the receptacle. A small amount of lost motion is permitted to allow for the movement of the feed member past the plane of the lowermost element so the braking action is not applied too soon nor too abruptly and the rubber cushion serves to further dampen the force. To effect more efficient withdrawal of the elements and to prevent abrasion during contact, the feed member is also provided with a rubber pad having a concave lateral surface so that, in effect, only linear contact with the element is made by the two edges of the feeding member instead of complete surface contact. The concave surface in conjunction with the vacuum also serves to first withdraw a central portion of the element from engagement with the next element before it is bowed past the lips of the receptacle. This prebowing permits air to enter between the elements and eliminates the possibility of their sticking together and, hence, any double feeding, and in combination with the lips distorts the plane of the element still further as it is moved past said lips.

Other objects and advantages will be apparent to those skilled in the art by the more detailed description which follows.

Reference is now made to the accompanying drawings wherein like reference numerals designate like parts and wherein:

Fig. 1 is a front elevation of a sorting apparatus embodying the invention;

Fig. 2 is a detail plan view of a typical element handled in the sorting apparatus disclosed in Fig. 1;

Fig. 3 is a vertical section through one of the receptacles shown in Fig. 1 and showing the relation of the various elements to the receptacle for effecting insertion or withdrawal of the elements;

Fig. 4 is an enlarged detail view of the feed member and showing the resilient means provided with a concave surface fixed thereto;

Fig. 5 is a perspective view of one embodiment of the stabilizing means;

Fig. 6 is a side elevation of the stabilizing means shown in Fig. 5;

Fig. 7 is a plan view with the upper section removed of the stabilizing means shown in Fig. 5;

Fig. 8 is a side elevation view of the embodiment of the stabilizing means shown in Fig. 6;

Fig. 9 is a side elevation of another embodiment of the stabilizing means;

Fig. 10 is a sectional view with one side broken away, and taken substantially along the line 10—10 of the stabilizing means shown in Fig. 9;

In the sorting apparatus disclosed in Fig. 1, a plurality of receptacles 20 are arranged linearly on each side of a reading station 21, the receptacles numbering ten on each side in addition to a reject receptacle 22. Receptacles 20 and 22 are rectangular and hollow and provided with open ends 23 and 24 and supporting lips 25 adjacent the open end 23, said lips being arranged on opposite sides at either the width or length of open end 23, or at the four corners. A conveyor 26 is arranged in close proximity to open ends 23, said conveyor being provided with marginal perforations which engage the teeth on sprockets 27 and 28. Sprocket 27 is driven intermittently by a Geneva drive not shown. As sprocket 27 is driven, conveyor 26 is moved to the right to move the elements 30 thereon into position under reading station 21 and then to a position under its designated receptacle in the right hand group. Conveyor 26 is provided with spaced apertures 29 over which the element 30 is retained by lands 31 and the upturned tabs 32.

Elements 30, as shown in Fig. 2, comprise a code area 33 and a document image area 34 and are provided with an elongated aperture 35 adjacent one edge thereof. The elements are positioned in any one of the left-hand group of receptacles 20 and the desired sort column is set up on a plug board associated with the circuitry of the sorter. The elements are then fed from the feed receptacle onto conveyor 26 and moved thereby into reading station 21 and then into position for insertion into the proper receptacle in the right-hand group. Upon completion of the sort in this direction, which is for the least significant figure (numeric sorting), the conveyor movement is reversed and the feeding then starts with the 0 receptacle in the right-hand group and when that is empty automatically progresses to the 1 receptacle, etc. The elements are then distributed after passing through the reading station 21 into the proper left-hand group of receptacles based on the code for the ten digit. The conveyor is then reversed for the next digit sort. It is to be understood, of course, that for each sort a different code area or line is read in reading station 21 for determining the receptacle which is to receive the element. A more detailed description of the sorting and the circuitry therefor is disclosed in the copending patent application Serial No. 490,077, filed February 23, 1955 in the names of A. W. Tyler, C. J. Hughey and W. C. Thomas.

Conveyor 26 moves over rails 40 carried by the supporting block 41 which is fixed to plate 42, see Fig. 3. Block 41 has fixed to the front thereof a plate 43 on the underside of which are mounted a plurality of solenoids 44, one of said solenoids being associated with each of receptacles 20. Block 41 also carries a cover 45 which, in effect, with plate 43 forms a chamber 46 having an opening 47 at one end thereof. A tubular member 48 connects a suitable vacuum pump, not shown, to chamber 46 via opening 47. Block 41 is provided with a plurality of horizontal apertures 49 and intersecting vertical apertures 50 to effect a passageway between chamber 46 and the chamber 51 formed by block 41, rails 40, conveyor 26 and the elements overlying apertures 29. The suction applied to chamber 51 need only be sufficient to retain elements 30 on conveyor 26.

Arranged within block 41 are a plurality of bearing sleeves 53, each of which is aligned with one of receptacles 20 and retained in position by means of lock screw 54. Sleeves 53 are provided with an aperture 55 and an aperture 56 which are vertically aligned, aperture 55 being also aligned with an aperture 57 in block 41 and aperture 56 being aligned with a vertical recess 58 also in block 41. Apertures 55 and 57 provide a passageway for vacuum line 59 which is connected to plate 42 and controlled by the solenoid-actuated valve 60, the vacuum pump connected to line 59 not being shown. Apertures 56 and 58 also provide a passageway to the atmosphere for purposes to be described hereinafter. Valve 60 is actuated with its respective solenoid 44, the actuation of which is in accordance with the code on the element. The circuitry for causing energization of the solenoids is fully disclosed in the above-mentioned Tyler et al. patent application. This circuitry provides a means for rendering the vacuum means operative for the necessary time.

Slideably mounted within each of sleeves 53 is a feed member or plunger 62 having a cylindrical shank 63 and a rectangular-shaped head 64. A passageway from the surface of head 64 to the side of shank 63 is provided by the blind central hole 65 and the intersecting aperture 66. The lower end of shank 63 is provided with a diametrical slot 67 in which link 68 is pivotally mounted at 69. Collar 70 which is fixed to the lower end of shank 63 retains spring 71 in position between said collar and a shoulder formed on the bottom of sleeves 53.

The reciprocating means for plunger 62 comprises arm 75 which is pivotally mounted on shaft 76 and which is actuated by cam 77 on shaft 78. Shaft 78 is driven from the same source as sprocket 27 so that reciprocation of plunger 62 and movement of conveyor 26 are in synchronism. Arm 75 carries a roller 79 at one end for engaging cam 77 and is provided at the other end with a latching lug 80, said arm being held against cam 77 by spring 81. Armature 83 of solenoid 44 is connected to link 68 by a link 84 which is pivotally connected to armature 83 at 85 and to link 68 at 86. Link 68 is provided at its lower end with a notch 87 which engages lug 80 for a purpose about to be described.

Normally, the solenoids 44 for each of receptacles 20 are not energized. Under this condition, the armatures 83 are fully extended to the right and links 84 hold links 68 in a position in which notch 87 is disengaged from lug 80. Shaft 78 can then be rotated and arm 75 is then reciprocated by cam 77 without any action of feed plunger 62. When the conditions for the sort to be made are set up on the various plugboards, the energization of the solenoids 44 associated with the receptacle from which the elements are to be withdrawn and the order of such feeding is accomplished automatically. As a result, when elements are to be withdrawn from a receptacle the solenoid 44 associated therewith is energized and maintained in an energized condition until every element has been removed from the receptacle. Whenever one of solenoids 44 is energized, link 84 is moved to the left by armature 83 and by its movement rotates link 68 about its pivot 69 to position notch 87 with respect to lug 80 whereby link 68 and arm 75 are interlocked and maintained in this condition as long as solenoid 44 is energized. The reciprocative movement of arm 75 by cam 77 is thus imparted to plunger 62. After an element has been positioned on conveyor 26 and moved into reading station 21, the receptacle into which the element is to be inserted is determined from the code and transmitted to a suitable memory device associated with the reading station, as indicated in the above-mentioned Tyler et al. patent application. The memory device then causes actuation of the proper solenoid 44 at the instant the element is aligned with the receptacle into which it is to be inserted. Link 68 is then latched to arm 75 for moving plunger 62 upwardly. It is to be understood that as long as the sorting operation is in progress, cams 77 are being continuously rotated and arms 75 are being continuously reciprocated and the only solenoid that is maintained in an energized condition is the one associated with the receptacle from which the elements are being withdrawn. In other words, on one side of reading station 21, one of the solenoids 44 will be continuously energized whereas on the other side the solenoids will be energized intermittently by the memory circuit in accordance with the receptacle designated to receive the element as determined in the code thereon. For insertion of an element solenoid 44 is, therefore, energized for a period only sufficient to remove the element from conveyor 26 and insert it into the receptacle.

Upon insertion, plunger 62 is moved upwardly, engages the element overlying aperture 29 in conveyor 26, and bows it past lips 25 to insert in the receptacle. The dimensions of plunger head 64 are such that it will pass through apertures 29 and between the lips 25 which can be arranged along either of the opposite sides of the open end 23 of the receptacles 20. Since the element must be bowed past lips 25 for insertion, it is evident that the extreme upward position of plunger 62 must be above the supporting plane of lips 25. In addition, this movement past lips 25 also serves to insure proper contact with the lowermost element for purposes of withdrawal. For purposes of insertion or withdrawal, therefore, it is evident that the stack of elements in a receptacle is subjected to considerable impact or force each time head 64 engages the lowermost element in the stack. This force is transmitted through the stack and causes the uppermost elements to flutter and become disarranged and to even jam the receptacle. Also, when only a few elements are in a receptacle it is practically impossible to withdraw them. These short-comings are eliminated by a stabilizing weight 88 to be described hereinafter.

When one of solenoids 44 is energized for withdrawing elements from a receptacle, valve 60 is also actuated to connect the vacuum pump to aperture 57 in block 41. As plunger 62 is moved upwardly by arm 75, aperture 66 becomes aligned with apertures 55 and 57. This occurs at substantially the instant plunger 62 contacts the lowermost element. As plunger 62 moves beyond the plane of lips 25, aperture 66 still connects apertures 55 and 57 with passageway 65 so the suction serves to grip the lowermost element to withdraw it from the stack. The suction is maintained until aperture 66 is moved beyond aperture 55, as plunger 62 is moved downwardly and at this time the withdrawn element is substantially in the plane of conveyor 26. Aperture 66 is then aligned with aperture 56 and a connection to the atmosphere is made from passageway 66 via apertures 66 and 56 to recess 58, thereby releasing the element.

In order to obtain more efficient withdrawal of the lowermost element by plunger 62 and thereby eliminate the possibility of double feeds, a rubber pad 90 is secured to head 64 of plunger 62, the rubber pad being substantially resilient and yieldable, see Figs. 3 and 4. The surface 91 of pad 90 which faces the receptacle is made concave in the direction of lips 25. With this arrangement, the element when on conveyor 26 or in the receptacle is first engaged by the ridges on pad 90 to provide a minimum surface engagement upon contact with plunger 62. Pad 90 is provided with an aperture 92 which aligns with passageway 65 in plunger 62. In withdrawing an element from a receptacle, the suction applied to plunger 62 draws the lowermost element into engagement with the surface 91 and conveys a curvature thereto which is sharper than that imparted to the element as it is bowed past lips 25. In other words, the element being withdrawn is distorted with respect to next and adjacent element and, as a result, a separation is obtained between the elements which permits air to move therebetween and effectively prevents any double feeds. As the element is withdrawn, its plane is distorted still more as the element is bowed past lips 25. To provide a more effective separation and distortion of the plane of the element being withdrawn aperture 92 can be elongated to provide a recess therein and which is associated with passageway 65. Distortion of the element being withdrawn can also be accomplished by providing lips at each corner of open end 23 and utilizing either a concave or a plane surface on pad 90.

One of the preferred embodiments of the stabilizing weight 88 is disclosed in Figs. 5–8. In Figs. 5–8, the weight comprises an upper block 100, a lower block 101, rubber pad 96 and plate 102, plate 102 being fixed to pad 96 for the purpose of eliminating any possible adherence to pad 96 of any element which would normally contact said pad and any abrasion of the image area thereby.

Block 100 is provided with spaced ears 103 and a central ear 104 which engages corresponding recesses in block 101 for securing said blocks together to form a unit by means of screws 105 and 106, respectively. Slot 107 in block 100 is aligned with a similar slot 108 in block 101 which is formed by a recess 109 and plate 110. Slots 107 and 108 are aligned with apertures 35 in elements 30 when weight 88 is positioned in a receptacle and permit entry of carrier 111 thereinto for removing the elements or withdrawal of the stick as said elements are inserted. To facilitate locating slot 107 with carrier 111, block 100 is provided with a sloping recess 112, all of whose walls slope toward said slot, as shown in Figs. 5, 6 and 8.

Block 101 is provided with a central recess 113 of the shape shown in Fig. 7, and which is open to one side of block 101. Two spaced recesses 114 and 115 are also formed in block 101 and are open to the other side of block 101. Within said recesses and pivotally mounted with respect to a common axis 116 are brake shoes 117, 118 and 119, each of which is provided at the outer end thereof with a non-metallic insert 120, 121 and 122 of any suitable material having a high coefficient of friction. In assembled relation with block 100, the surface 123 of block 100 overlies recess 113, 114 and 115 so that only angular surfaces 124 of the brake shoes are exposed on opposite sides of weight 88. A central recess 125 which terminates in slot 108 on the underside of block 101 also has pivotally mounted therein at 126, a brake shoe 127 having a non-metallic insert 128, this recess being covered by rubber pad 96. Plate 102, which is secured to pad 96, is provided with an undercut 129 so that only marginal contact is made with the uppermost element in the stack.

When weight 88 is without a receptacle, as shown in Fig. 5, brake shoes 117, 118 and 119 lie against the bottom of their respective recess due to distribution of their weight with respect to the pivot point 116. In the same manner, brake shoe 127 abuts the inner or upper surface of recess 125. Upon insertion into a receptacle, however, brake shoes 117, 118 and 119 are pivoted upwardly due to the dimensional relation of blocks 100 and 101 with respect to the inside dimensions of the receptacle. As a result, weight 88 is free to move downwardly within a receptacle until it comes to rest with plate 102 in contact with the uppermost element. In this position with respect to the elements within the receptacle, all of the parts comprising the unit 88, as shown in Figs. 5–7, serve to act as a weight to maintain the elements flat and in contiguous relation on lips 25. Further, since brake shoes 117, 118 and 119 permit downward movement, weight 88 follows the stack of elements as it decreases due to feeding out of the elements.

The stabilizing weight 88 also serves to damp the impact of plunger 62 upon contact with the stack of elements. This is accomplished by rubber pad 96 and brake shoes 117, 118 and 119. When plunger 62 strikes the stack of elements, the force is transmitted through the stack and causes weight 88 to move upwardly. This upward movement is, however, arrested by inserts 120, 121 and 122 engaging the opposite walls of the receptacle as they are moved in a direction opposed to that of the force due to their pivotal arrangement. A small amount of lost motion is permitted such that the braking action is not applied too soon or too abruptly which also permits movement of plunger 62 beyond the plane of lips 25. As a result, the uppermost elements are not allowed to flutter due to the impact action. Also, since weight 88 is freely movable in a downward direction, it always settles into contact with uppermost element and readily permits either withdrawal or insertion of the elements from the receptacle and provides the same action whether the receptacle is completely full or nearly empty. Such a weight can also serve as a retainer for the elements when positioned in a receptacle for purposes of handling or transporting. For example, if the receptacle 20 shown in Fig. 3 were detached from the apparatus, it could be inverted and brake shoes 117, 118 and 119 would prevent movement of weight 88 in what would then be a downward direction. Further, any force or action applied to the receptacle would also prevent movement of the elements.

In order to insert elements 30 into a receptacle or to remove them therefrom, carrier 111 is provided. Carrier 111 is a long member having a cross section the same as aperture 35 in the elements 30. A handle can be provided at one end and the other end may be tapered for readily inserting it in apertures 35 and is adapted to receive a retainer which latches on said other end. In the apparatus described, receptacles 20 are pivotally mounted for movement away from conveyor 26. In this position, for removal of the elements, carrier 111 is inserted in end 24 of receptacle 20 and directed by recess 112 into slots 107 and 108 and then into the aligned apertures 35 in elements 30. Carrier 111 is pushed past brake shoe 127 which normally opposes movement of carrier 111 with respect to weight 88; however, since the engagement is frictional, carrier 111 can be moved toward open end 23. When the end of carrier 111 extends beyond open end 23, the retainer is then latched on and withdrawn through the open end 23 with weight 88 and elements 30 through open end 24. In this instance, the frictional engagement of brake shoe inserts 120, 121 and 122 with the walls of receptacle 20 must be overcome in withdrawing the entire unit.

If the elements just removed are to be placed in another receptacle, the end of carrier 111 carrying the retainer is inserted into the open end 24 of the receptacle first. When the elements are positioned with respect to lips 25, the retainer will be without the receptacle and can be removed. Carrier 111 is then withdrawn through end 24 and is freely movable with respect to weight 88 because brake shoe 127 does not oppose movement of the carrier in this direction. As a result, weight 88 remains in the receptacle together with the elements positioned therein.

In Figs. 9 and 10 another embodiment of stabilizing weight 88 is disclosed in which only a single braking member is utilized. The upper block 100 is provided with spaced ears 103, a central ear 104, a slot 107 and a recess 112, as in the previously described embodiment. Block 101 is provided with a central recess 130, a recess 131 which is covered by plate 132 to form a slot 133 aligned with slot 107 in block 100, a slot 134 in the upper portion of block 101, side recesses 135, and with a portion thereof beneath slot 134 which has been removed for a purpose to be described hereinafter. Rubber pad 96 is secured to block 101 and plate 102 is fixed to said pad. Plates 136 are secured to block 100 in recesses 135 by screws 137 and are adjustable therein lengthwise with respect to block 101 by means of said screws and the elongated slots 138 in said plates. Each of plates 136 is provided with an elongated slot 139 which is arranged at an angle from the vertical. The ends of pin 140 are movable along slots 139 and said pin carries a nonmetallic roller 141, said roller being formed of a suitable material having a high coefficient of friction and movable in the cavity formed by the portion removed from block 101 below recess 134 and plates 136. Lever 142 is pivotally mounted at 143 within recess 130 and carries a roller 150 on one end 144 and which extends into slot 133 for a purpose to be described hereinafter. The other end of lever 142 is provided with bifurcated arms 145 for engaging portions of pin 140 on each side of roller 141. The weight of pin 140 and roller 141 is sufficient to maintain lever 142 in the position shown in Fig. 9; however, plates 136 are initially adjusted so pin 140 does not quite seat in the bottom of slots 139 but that roller 141 and the faces of plate 132 and block 100 which are opposite said roller engage the walls of the receptacle with the desired amount of friction to prevent movement of stabilizing weight 88 in a direction away from the uppermost element. On the other hand, when weight 88 is inserted in receptacle 20 through open end 24, the frictional engagement of the side of weight 88 and roller 141 with the walls of the receptacle is overcome by the weight first moving a small amount relative to roller 141 or in other words, roller 141 moves upward in slots 139 whereby roller 141 is moved away from the wall and weight 88 is then free to move in a direction toward the other end 23. Slots 139, therefore, permit weight 88 to follow the stack as it decreases in size due to withdrawal of the elements through open end 23. When elements are inserted in the open end 23, plunger 62 is moved beyond the plane of the lowermost element in the receptacle so that the force applied thereto is transmitted through the stack. This force, which is dampened by pad 96 does, however, raise weight 88 with respect to roller 141 and causes slots 139 to cam roller 141 into greater frictional engagement with its respective wall. By this action, since pin 140 is not seated in the bottom of the slots 139, the movement of weight 88 is limited to a very small amount in the direction toward open end 24, and at the same time permits elements to be successively inserted through open end 23. It can be readily appreciated that if a receptacle were turned upside down, slots 139 would tend to cam roller 141 against the wall due to weight 88 and the stack thereover. As a result, slots 139 and roller 141 permit weight 88 to move freely in one direction and permit only limited movement of said weight in the other direction.

When it is desired to remove weight 88 and the elements in the stack by means of carrier 111, as described above, the inserted end of carrier 111 strikes roller 150 carried by end 144 of lever 142 which extends into slot 133 and pivots it about the center thereof to disengage roller 141 from the wall by moving pin 140 upward in slots 139, thereby positioning roller 141 partially in slot 134, as shown in dotted lines in Fig. 9. Roller 141 is held in this disengaged position as long as carrier 111 is within slot 133 and permits insertion or removal of the elements through open end 24. Upon withdrawal of carrier 111 from slot 133, lever 142 automatically assumes the position shown in Fig. 9 due to the weight of pin 140 and roller 141. By providing roller 150 on end 144 of lever 142 and which is preferably of nylon, or some other suitable material having a low coefficient of friction, the insertion and withdrawal of carrier 111 into and from slot 133 is greatly facilitated and prevents any binding of carrier 111 between said roller and the opposite wall of said slot.

While the invention has been disclosed and described with respect to a particular apparatus, those skilled in the art will realize that it may be applied in other apparatus with the same results. Further, materials other than those disclosed for pads 90 and 96, and inserts 120, 121, 122 and 128 may be used to provide similar results. Also, spring members of the different types can be substituted for brake shoes 117, 118, 119 and 127 to obtain the same results. Various changes and modifications may be made in the invention by those skilled in the art without departing from the spirit thereof. The invention is, therefore, not to be limited to the disclosure but if of the scope defined by the appended claims.

Having now particularly described my invention, what I desire to secure by Letters Patent of the United States and what I claim is:

1. In combination with an open end receptacle having lips adjacent one open end which engage the lowermost element of a plurality of discrete elements and support said elements in superposed relation, a device for inserting said discrete elements into said receptacle comprising means arranged in close proximity to said one open end for conveying said discrete elements to said receptacle, said conveying means being provided with spaced apertures and means adjacent the edges of each aperture for retaining said elements in a fixed relation thereon, drive means for intermittently advancing said conveying means, reciprocating means arranged beneath said conveying means and operable during the interval said conveying means is stationary for movement through the aperture aligned with the one open end of said receptacle to move the element thereover toward said receptacle and bow the element past said lips to insert it in said receptacle, and stabilizing means movable within said receptacle and engaging the uppermost element therein for damping the impact effect of said reciprocating means on said elements when inserting said elements into said receptacle.

2. In combination with an open end receptacle having lips adjacent one open end which engage the lowermost element of a plurality of discrete elements and support said elements in superposed relation, a device for withdrawing said discrete elements from said receptacle comprising means arranged in close proximity to said one open end for conveying said discrete elements away from said receptacle, said conveying means being provided with spaced apertures and means adjacent the edges of each aperture for retaining said elements in a fixed relation thereon, drive means for intermittently advancing said conveying means, reciprocating means operatively connected to said drive means, arranged beneath said conveying means and operable during the interval said conveying means is stationary for movement through the aperture aligned with the open end of said receptacle to engage and withdraw the lowermost element in said receptacle by bowing it past said lips and delivering it in proper relation over the aperture and on said conveying means, and vacuum means associated with said reciprocating means for maintaining said element thereon and which cooperates with said lips to distort the plane of said element with respect to the next and adjacent element as said element is moved past said lips.

3. In combination with an open end receptacle having lips adjacent one open end which engage the lowermost element of a plurality of discrete elements and support said elements in superposed relation, a device for withdrawing said discrete elements from said receptacle comprising means arranged in close proximity to said one open end for conveying said discrete elements away from said receptacle, said conveying means being provided with spaced apertures and means adjacent the edges of each aperture for retaining said elements in a fixed relation thereon, drive means for intermittently advancing said conveying means, a member arranged beneath said conveying means and including a resilient pad having a concave surface for engaging the lowermost element in said receptacle, said member being provided with a passageway from said surface to one side thereof, means operatively connected to said drive means and to said member during the interval said conveying means is stationary for reciprocating said member through the aperture in said conveying means to withdraw the lowermost element in said receptacle by bowing it past said lips and delivering it in proper relation over the aperture on said conveying means, and vacuum means for maintaining said element in engagement with said concave surface which cooperates with said lips to distort the plane of the element being withdrawn with respect to the next and adjacent element as said element is moved past said lips.

4. In combination with an open end receptacle having lips adjacent one open end which engage the lowermost element of a plurality of discrete elements and support said elements in superposed relation, a device for withdrawing said discrete elements from said receptacle comprising means arranged in close proximity to said one open end for conveying said discrete elements away from said receptacle, said conveying means being provided with spaced apertures and means adjacent the edges of each aperture for retaining said elements in a fixed relation thereon, drive means for intermittently advancing said conveying means, reciprocating means operatively connected to said drive means, arranged beneath said conveying means and operable during the interval said conveying means is stationary for movement through the aperture aligned with the open end of said receptacle to engage and withdraw the lowermost element in said receptacle by bowing it past said lips and delivering it in proper relation over the aperture and on said conveying means, vacuum means operatively connected to said reciprocating means for maintaining the element being withdrawn on said reciprocating means from the time said reciprocating means engages the lowermost element until said element being withdrawn is deposited on said conveying means, and stabilizing means movable within said receptacle and engaging the uppermost element therein for damping the impact effect of said reciprocating means on said elements when withdrawing said elements from said receptacle.

5. In combination with an open end receptacle having lips adjacent one open end which engage the lowermost element of a plurality of discrete elements and support said elements in superposed relation, a device for withdrawing said discrete elements from said receptacle comprising means arranged in close proximity to said one open end for conveying said discrete elements away from said receptacle, said conveying means being provided with spaced apertures and means adjacent the edges of each aperture for retaining said elements in a fixed relation thereon, drive means for intermittently advancing said conveying means, a member arranged beneath said conveying means and including a resilient pad having a concave surface for engaging the lowermost element in said receptacle, said member being provided with a passageway from said surface to one side thereof, means operatively connected to said drive means and to said member during the interval said conveying means is stationary for reciprocating said member through the aperture in said conveying means to withdraw the lowermost element in said receptacle by bowing it past said lips and delivering it in proper relation over the aperture on said conveying means, vacuum means for maintaining said element in engagement with said concave surface and which cooperates with said lips to distort the plane of the element being withdrawn with respect to the next and adjacent element as said element is moved past said lips, and stabilizing means movable within said receptacle and engaging the uppermost element therein for damping the impact effect of said member on said elements when withdrawing said elements from said receptacle.

6. In combination with an open end receptacle having lips adjacent one open end which engage the lowermost element of a plurality of discrete elements and support said elements in superposed relation, a device for inserting and withdrawing said discrete elements into and from said receptacle comprising means arranged in close proximity to said one open end for conveying said discrete elements to and away from said receptacle, said conveying means being provided with spaced apertures and means adjacent the edges of each aperture for retaining said elements in a fixed relation thereon, drive means for intermittently advancing said conveying means, reciprocating means arranged beneath said conveying means and operatively connected to said drive means, said reciprocating means being operable during the interval said conveying means is stationary for movement through the aperture aligned with the open end of said receptacle to move the element thereover toward said receptacle and bow the element past said lips to insert it in said receptacle and to withdraw the lowermost element in said receptacle by bowing it past said lips and delivering it in proper relation over the aperture on said conveying means, and means operatively associated with said reciprocating means for selectively controlling the insertion and withdrawal of said elements.

7. In combination with an open end receptacle having lips adjacent one open end which engage the lowermost element of a plurality of discrete elements and support said elements in superposed relation, a device for inserting and withdrawing said discrete elements into and from said receptacle comprising means arranged in close proximity to said one open end for conveying said discrete elements to and away from said receptacle, said conveying means being provided with spaced apertures and means adjacent the edges of each aperture for retaining said elements in a fixed relation thereon, reciprocating means operatively connected to said drive means, arranged beneath said conveying means and operable during the interval said conveying means is stationary for movement through the aperture aligned with the open end of said receptacle to move the element thereover toward said receptacle and bow the element past said lips to insert it in said receptacle and for withdrawing the lowermost element in said receptacle by bowing it past said lips and delivering it in proper relation over the aperture on said conveying means, vacuum means operatively connected to said reciprocating means for maintaining the element being withdrawn on said reciprocating means from the time said reciprocating means engages the lowermost element until said element being withdrawn is deposited on said conveying means, and means for rendering said vacuum means operative only when said elements are to be withdrawn from said receptacle.

8. In combination with an open end receptacle having lips adjacent one open end which engage the lowermost element of a plurality of discrete elements and support said elements in superposed relation, a device for inserting and withdrawing said discrete elements into and from said receptacle comprising means arranged in close proximity to said one open end for conveying said discrete elements to and away from said receptacle, said conveying means being provided with spaced apertures and means adjacent the edges of each aperture for retaining said elements in a fixed relation thereon, a member arranged beneath said conveying means and including a resilient pad having a concave surface for engaging the element positioned on said conveying means and the lowermost element in said receptacle, said member being provided with a passageway from said surface to one side thereof, means operatively connected to said drive means and to said member during the interval said conveying means is stationary for reciprocating said member through the aperture in said conveying means to move the element thereover toward said receptacle and bow the element past said lips to insert it in said receptacle and to withdraw the lowermost element in said receptacle by bowing it past said lips and deliver it in proper relation over the aperture on said conveying means, vacuum means operatively connected to said passageway for maintaining the element being withdrawn on said member from the time said member engages the lowermost element until said element is deposited on said conveying means, and means for rendering said vacuum means operative only when said elements are to be withdrawn from said receptacle.

9. In combination with an open end receptacle having lips adjacent one open end which engage the lowermost element of a plurality of discrete elements and support said elements in superposed relation, a device for inserting and withdrawing said discrete elements into and from said receptacle comprising means arranged in close proximity to said one open end for conveying said discrete elements to and away from said receptacle, said conveying means being provided with spaced apertures and means adjacent the edges of each aperture for retaining said elements in a fixed relation thereon, drive means for intermittently advancing said conveying means, a member arranged beneath said conveying means and including a resilient pad having a concave surface for engaging the element positioned on said conveying means and the lowermost element in said receptacle, said member being provided with a passageway from said surface to one side thereof, means operatively connected to said drive means and to said member during the interval said conveying means is stationary for reciprocating said member through the aperture in said conveying means to move the element thereover toward said receptacle and bow the element past said lips to insert it in said receptacle and to withdraw the lowermost element in said receptacle by bowing it past said lips and delivering it in proper relation over the aperture on said conveying means, vacuum means operatively connected to said passageway when an element is to be withdrawn from said receptacle for maintaining said element in engagement with said concave surface which cooperates with said lips to distort the plane of the element being withdrawn with respect to the next and adjacent element as said element is moved past said lips, and stabilizing means movable within said receptacle and engaging the uppermost element therein for damping the impact effect of said reciprocating means on said elements when said elements are inserted into and withdrawn from said receptacle thereby.

10. In combination with an open end receptacle having lips adjacent one open end which engage the lowermost element of a plurality of discrete elements and support said elements in superposed relation, a device for inserting and withdrawing said discrete elements into and from said receptacle comprising means arranged in close proximity to said one open end for conveying said discrete elements to and away from said receptacle, said conveying means being provided with spaced apertures and means adjacent the edges of each aperture for retaining said elements in a fixed relation thereon, drive means for intermittently advancing said conveying means, reciprocating means operatively connected to said drive means, arranged beneath said conveying means and operable during the interval said conveying means is stationary for movement through the aperture aligned with the one open end of said receptacle to move the element thereover toward said receptacle and bow the element past said lips to insert it in said receptacle and to withdraw the lowermost element in said receptacle by bowing it past said lips and delivering it in proper relation over the aperture on said conveying means, vacuum means operatively connected to said reciprocating means when an element is to be withdrawn from said receptacle for maintaining said element in engagement with said reciprocating means and cooperating with said lips to distort the plane of the element being withdrawn with respect to the next and adjacent element as said element is moved past lips, means for rendering said vacuum means operative only when said elements are to be withdrawn from said receptacle, stabilizing means insertable and movable within said receptacle for maintaining said elements in flat and contiguous relation and against said lips and including a shock absorbing medium for engaging the uppermost element in said receptacle, and means mounted on said stabilizing means for permitting free movement of said stabilizing means within said receptacle in accordance with the increasing or decreasing number of said elements and for engaging at least one wall of said receptacle to restrain movement of said stabilizing means and said elements by the impact effect of said reciprocating means on said elements when said elements are inserted into and withdrawn from said receptacle thereby.

11. In combination with an open end receptacle having marginal lips adjacent one open end which engage the lowermost element of a plurality of discrete elements and support said elements in superposed relation, a device for inserting and withdrawing said discrete elements into and from said receptacle comprising means arranged in close proximity to said one open end for conveying said discrete elements to and away from said receptacle, said conveying means being provided with spaced apertures and means adjacent the edges of each aperture for retaining said elements in a fixed relation thereon, drive means for intermittently advancing said conveying means, a member arranged beneath said conveying means and including a resilient pad having a concave surface for engaging the element positioned on said conveying means and the lowermost element in said receptacle, said member being provided with a passageway from said surface to one side thereof, means operatively connected to said drive means and to said member during the interval said conveying means is stationary for reciprocating said member through the aperture in said conveying means to move the element thereover toward said receptacle and bow the element past lips to insert it in said receptacle and to withdraw the lowermost element in said receptacle by bowing it past said lips and delivering it in proper relation over the aperture on said conveying means, vacuum means operatively connected to said passageway when an element is to be withdrawn from said receptacle for maintaining said element in engagement with said concave surface which cooperates with said lips to distort the plane of the element being withdrawn with respect to the next and adjacent element as said element is moved past said lips, means operatively associated with said reciprocating means for selectively controlling the insertion and withdrawal of said elements, stabilizing means insertable and movable within said receptacle for maintaining said element in flat and contiguous relation and against said lips and including a shock absorbing medium for engaging the uppermost element in said receptacle, and means mounted on said stabilizing means for permitting free movement of said stabilizing means within said receptacle in accordance with the increasing or decreasing number of said elements and for engaging at least one wall of said receptacle to restrain movement of said stabilizing means and said elements by the impact effect of said member on said elements when said elements are inserted into and removed from said receptacle thereby.

12. In combination with a receptacle having open ends and lips adjacent one open end for supporting a plurality of discrete elements in superposed relation therein, a member insertable in the other open end of said receptacle and movable therewithin, and a shock absorbing medium fixed to said member for engaging the uppermost element in said receptacle, said member and shock absorbing medium maintaining the elements in said receptacle in flat and contiguous relation and against said lips and damping any force applied to the lowermost element which tends to move said elements away from said lips.

13. In combination with a receptacle having open ends and lips adjacent one open end for supporting a plurality of discrete elements in superposed relation therein, a member insertable in the other open end of said receptacle and movable therewithin, a resilient pad fixed to said member for engaging the uppermost element in said receptacle, said member and resilient pad maintaining the elements in said receptacle in flat and contiguous relation and against said lips and damping any force applied to the lowermost element which tends to move said elements away from said lips.

14. In combination with a receptacle having open ends and lips adjacent one open end for supporting a plurality of discrete elements in superposed relation therein, a member insertable in the other open end of said receptacle and freely movable therewithin in a direction toward the uppermost element, a shock absorbing medium fixed to said member for engaging the uppermost element in said receptacle, said member and shock absorbing medium maintaining the elements in said receptacle in flat and contiguous relation and against said lips, and means carried by said member for engaging at least one wall of said receptacle to prevent movement of said member in a direction toward the other open end by any force which tends to move said elements away from said lips.

15. In combination with a receptacle having open ends and lips adjacent one open end for supporting a plurality of discrete elements in superposed relation therein, a member insertable in the other open end of said receptacle and freely movable therewithin in a direction toward said one open end, a resilient pad fixed to said member for engaging the uppermost element in said receptacle, said member and resilient pad maintaining said elements in flat and contiguous relation and against said lips and damping any force applied to the lowermost element which tends to move said elements away from said lips, and means pivotally mounted within said member and engaging at least one wall of said receptacle for limiting the movement of said member in a direction toward the other open end with the application of said force.

16. In combination with a receptacle having open ends and lips adjacent one open end for supporting a plurality of discrete elements in superposed relation therein, a member insertable in the other open end of said receptacle, shock absorbing means fixed to said member for engaging the uppermost element in said receptacle, said member and shock absorbing means serving as a weight to maintain the elements in said receptacle in flat and contiguous relation and against said lips, and at least one braking member pivotally mounted on said member and movable therewith, said braking member normally permitting free movement of said member within said receptacle in a direction toward said one open end and being movable to a position for engaging at least one wall of said receptacle for limiting movement of said member in a direction toward the other open end by any force tending to move said elements away from said lips.

17. In combination with a receptacle having open ends and lips adjacent one open end for supporting a plurality of discrete elements in superposed relation therein, a member insertable in the other open end of said receptacle, said member being provided with at least one recess, a resilient pad fixed to said member for engaging the uppermost element in said receptacle, said member and resilient pad serving as a weight to maintain the elements in said receptacle in flat and contiguous relation and against said lips, and a braking member pivotally mounted within said recess and having a non-metallic braking surface, said braking members normally permitting free movement of said member within said receptacle toward said one open end and being movable to a position in which said braking surface engages one of the walls of said receptacle for limiting movement of said member in a direction toward the other open end by any force tending to move said elements away from said lips.

18. In combination with a hollow rectangular receptacle having open ends and lips adjacent one open end for supporting a plurality of discrete elements in superposed relation therein, a member comprising two sections and forming a unit insertable in the other open end of said receptacle, the lower section being provided with three open-end and coplanar recesses, one recess extending centrally of said lower section and to one side thereof and the other recesses being in spaced relation and extending to the opposite side of said lower section, a resilient rubber pad secured to said lower section for engaging the uppermost element in said receptacle, said member and said pad serving as a weight to maintain the elements in said receptacle in flat and contiguous relation and against said lips and for damping any force applied to said elements and to said receptacle, and a braking member having a non-metallic braking surface arranged in each of said recesses, said braking members being pivotally mounted about the same axis so that said braking members normally lie against the bottom of their respective recess and being movable upon insertion of said member into said receptacle into positions in which said braking surfaces thereof engage opposite sides of said receptacle to permit free movement of said member in a direction toward said one open end and frictionally engage opposite sides of said receptacle to permit only limited movement of said member in a direction toward the other open end upon application of any force tending to move said elements away from said lips.

19. In combination with a hollow rectangular receptacle having open ends and lips adjacent one open end for supporting a plurality of discrete elements in superposed relation therein, each of said elements being provided with a non-circular aperture adjacent one edge thereof and in alignment when in said receptacle, a member comprising two sections and forming a unit insertable in the other open end of said receptacle, the lower section being provided with three open-end and coplanar recesses, one recess extending centrally of said lower section and the other recesses being in spaced parallel relation and extending to the opposite side of said lower section, an aperture congruent to and in alignment with the apertures in said elements when said member is positioned in said receptacle, and a recess below said coplanar recesses and extending centrally of said lower section from the aperture therein, and the upper section being fixed to said lower section over said coplanar recesses and provided with an aperture congruent to and in alignment with the aperture in said lower section and with a recess in the surface toward the open end of said receptacle and having walls sloping toward said aperture, a resilient rubber pad secured to said lower section and covering said lower recess for engaging the uppermost element in said receptacle, said member and said pad serving as a weight to maintain the elements in said receptacle in flat and contiguous relation and against said lips, means having a cross-section congruous to said apertures and adapted to be inserted in the other open end of said receptacle and directed by the walls of the recess in said upper section into said apertures for receiving said elements thereon, a braking member having a non-metallic braking surface arranged in each of said coplanar recesses, said braking members being pivotally mounted about the same axis and normally lying against the bottom of their respective recesses and being movable upon insertion of said member into said receptacle into positions in which said surfaces engage opposite sides of said receptacle and permit free movement in a direction toward and away from said elements and only limited movement of said member by any force tending to move said elements away from said lips, and a holding member pivotally mounted within said lower recess and having a non-metallic bearing surface for engaging said receiving means when inserted into said apertures to prevent movement of said member relative to said receiving means and to permit withdrawal of said receiving means from said member when in said receptacle.

20. In combination with a hollow rectangular receptacle having open ends and lips adjacent one open end for supporting a plurality of discrete elements in superposed relation therein, each of said elements being provided with a non-circular aperture adjacent one edge thereof and in alignment when in said receptacle, a member comprising two sections and forming a unit insertable in the other open end of said receptacle, the lower section being provided with a lateral recess and an aperture congruent to and in alignment with the apertures in said elements when said member is positioned within said receptacle, and the upper section being fixed to said lower section and provided with an aperture congruent to and in alignment with the aperture in said lower section and with a recess having walls sloping toward said aperture, a resilient rubber pad secured to said lower section and covering said lower recess for engaging the uppermost element in said receptacle, said member and said pad serving as weight to maintain the elements in said receptacle in flat and contiguous relation and against said lips, a braking member mounted within the recess in said lower section for movement along a path at an angle with respect to one of the walls of the receptacle and normally maintained by the angular path in frictional engagement with the one wall, and an actuating member pivotally mounted intermediate its ends within the recess in said lower section, one end of said actuating lying within the aperture in said lower section and the other end thereof engaging said braking member for moving said braking member along said path to disengage said braking member from said wall, whereby said braking member normally permits free movement of said member in a direction toward said one open end and, upon application of any force to said receptacle and said elements which tends to move said elements away from said lips, permits only limited movement of said member toward the other open end of said receptacle.

21. In combination with a hollow rectangular receptacle having open ends and lips adjacent one open end for supporting a plurality of discrete elements in superposed relation therein, each of said elements being provided with a non-circular aperture adjacent one edge thereof and in alignment when in said receptacle, a member comprising two sections and forming a unit insertable in the other open end of said receptacle, the lower section being provided with a lateral recess and an aperture congruent to and in alignment with the apertures in said elements when said member is positioned within said receptacle, and the upper section being fixed to said lower section and provided with an aperture congruent to and in alignment with the aperture in said lower section and with a recess having walls sloping toward said aperture, a resilient rubber pad secured to said lower section and covering said lower recess for engaging the uppermost element in said receptacle, said member and said pad serving as weight to maintain the elements in said receptacle in flat and contiguous relation and against said lips, a braking member mounted within the recess in said lower section for movement along a path at an angle with respect to one of the walls of the receptacle and normally maintained by the angular path in frictional engagement with the one wall, an actuating member pivotally mounted intermediate its ends within the recess in said lower section, one end of said actuating lying within the aperture in said lower section and the other end thereof engaging said braking member for moving said braking member along said path to disengage said braking member from said wall, whereby said braking member normally permits free movement of said member in a direction toward said one open end and, upon application of any force to said receptacle and said elements which tends to move said elements away from said lips, permits only limited movement of said member toward the other open end of said receptacle, and means having a cross-section congruous to said apertures and adapted to be inserted in the other open end of said receptacle and directed by the walls of the recess in said upper section into said apertures for receiving said elements therein and for engaging the one end of said actuating member to raise and disengage said brake member from the wall of said receptacle and to maintain said braking member in the disengaged position for permitting withdrawal of said member and said elements through the other open end of said receptacle.

22. In combination with an open end receptacle having lips adjacent one open end which engage the lowermost element of a plurality of discrete elements and support said elements in superposed relation, a reciprocating device for removing the lowermost element, comprising a feed member having a passageway and a concave surface transversely thereof and supported for movement toward and away from said receptacle and between said lips to effect withdrawal of the lowermost element, means operatively connected to said feed member for imparting reciprocative movement thereto, and vacuum means operatively connected to said passageway during the interval of engagement of the lowermost element by said feed member and withdrawal thereof from said receptacle, said vacuum means drawing and holding the lowermost element in engagement with said concave surface whereby that portion of said lowermost element in engagement with said surface is first separated from the next and adjacent element and a curvature is imparted thereto different from the normal curvature imparted thereto as the withdrawal is effected by said feed member as the lowermost element is bowed past said lips.

23. In combination with an open end receptacle having lips adjacent one open end which engage the lowermost element of a plurality of discrete elements and support said elements in superposed relation, a reciprocating device for removing the lowermost element, comprising a feed member having a passageway and supported for movement toward and away from said receptacle and between said lips to effect withdrawal of the lowermost element, a resilient pad fixed to said feed member and having a concave surface transversely thereof for engaging the lowermost element in said receptacle and provided with an aperture aligned with said passageway, means operatively connected to said feed member for imparting reciprocative movement thereto, and vacuum means operatively connected to said passageway during the interval of engagement of the lowermost element by said resilient pad and withdrawal thereof from said receptacle, said vacuum means drawing and holding the lowermost element in engagement with said concave surface whereby said concave surface imparts to that portion of said lowermost element a curvature different from the normal curvature imparted thereto as the withdrawal is effected by said feed member bowing the lowermost element past said lips.

24. In combination with an open end receptacle having lips adjacent one open end which engage the lowermost element of a plurality of discrete elements and support said elements in superposed relation, a reciprocating device for removing the lowermost element comprising a feed member having a passageway and supported for movement toward and away from said receptacle and between said lips to effect withdrawal of the lowermost element, a rubber pad fixed to said feed member and having a concave surface transversely thereof for engaging the lowermost element in said receptacle and provided with an aperture aligned with said passageway, means operatively connected to said feed member for imparting reciprocative movement thereto, and vacuum means operatively connected to said passageway during the interval of engagement of the lowermost element by said rubber pad and withdrawal thereof from said receptacle, said vacuum means drawing and holding the lowermost element in engagement with said concave surface during said interval, whereby that portion of said lowermost element in engagement with said surface is first separated from the next and adjacent element and the plane of the element being withdrawn is further distorted with respect to the next and adjacent element as said element is moved past said lips.

No references cited.